(12) United States Patent
Landry et al.

(10) Patent No.: US 8,936,734 B2
(45) Date of Patent: Jan. 20, 2015

(54) SYSTEM FOR HARVESTING ORIENTED LIGHT—WATER SPLITTING

(71) Applicant: Sunpower Technologies LLC, San Marcos, CA (US)

(72) Inventors: Daniel Landry, Redondo Beach, CA (US); Travis Jennings, San Diego, CA (US)

(73) Assignee: Sunpower Technologies LLC, San Marcos, CA (US)

( * ) Notice: Subject to any disclaimer, the term of this patent is extended or adjusted under 35 U.S.C. 154(b) by 0 days.

(21) Appl. No.: 13/792,698

(22) Filed: Mar. 11, 2013

(65) Prior Publication Data

US 2014/0252275 A1   Sep. 11, 2014

(51) Int. Cl.
*C01B 3/06* (2006.01)
*G02B 26/08* (2006.01)

(52) U.S. Cl.
CPC .............. *G02B 26/0816* (2013.01); *C01B 3/06* (2013.01)
USPC ........................................................ 252/372

(58) Field of Classification Search
CPC ...................................................... B01J 19/127
See application file for complete search history.

(56) References Cited

U.S. PATENT DOCUMENTS

| | | | |
|---|---|---|---|
| 5,818,649 A | 10/1998 | Anderson | |
| 6,361,660 B1 | 3/2002 | Goldstein | |
| 6,875,661 B2 | 4/2005 | Mitzi | |
| 7,019,801 B2 | 3/2006 | Ueki et al. | |
| 7,786,188 B2 | 8/2010 | Tomalia et al. | |
| 7,981,261 B2 | 7/2011 | Rajh et al. | |
| 8,067,259 B2 | 11/2011 | Landry et al. | |
| 2007/0148084 A1* | 6/2007 | Radhakrishnan et al. | . 423/648.1 |
| 2009/0010837 A1* | 1/2009 | Yabe et al. | ..... 423/657 |
| 2009/0020150 A1 | 1/2009 | Atwater et al. | |
| 2009/0235974 A1 | 9/2009 | Mapel et al. | |
| 2009/0321244 A1 | 12/2009 | Smith et al. | |
| 2010/0098902 A1* | 4/2010 | Kotov et al. | ..... 428/105 |
| 2010/0133111 A1 | 6/2010 | Nocera et al. | |
| 2011/0048962 A1 | 3/2011 | Reece et al. | |
| 2011/0056841 A1 | 3/2011 | Wehrenberg et al. | |
| 2011/0220191 A1* | 9/2011 | Flood | ............ 136/255 |
| 2011/0253217 A1* | 10/2011 | Grossman et al. | ........... 136/263 |
| 2011/0315545 A1 | 12/2011 | Kuroha et al. | |
| 2012/0063967 A1 | 3/2012 | Tokuhiro et al. | |
| 2012/0104325 A1 | 5/2012 | Talapin et al. | |
| 2012/0118723 A1 | 5/2012 | Mao et al. | |
| 2012/0125781 A1 | 5/2012 | Zhang et al. | |
| 2012/0145532 A1 | 6/2012 | Smolyakov et al. | |
| 2012/0225770 A1* | 9/2012 | Tamaoka | ............ 502/1 |
| 2012/0305061 A1 | 12/2012 | O'Brien et al. | |

FOREIGN PATENT DOCUMENTS

WO    WO 2012/031357    3/2012

* cited by examiner

*Primary Examiner* — Melvin C Mayes
*Assistant Examiner* — Douglas Call
(74) *Attorney, Agent, or Firm* — Eric Sophir; Dentons US LLP

(57) ABSTRACT

A system and method for splitting water to produce hydrogen and oxygen employing focused polarized sunlight energy is disclosed. Hydrogen and oxygen may then be stored for later use as fuels. The system and method use inorganic capping agents that cap the surface of semiconductor nanocrystals to form photocatalytic capped colloidal nanocrystals, which may be deposited and oriented on a substrate to form an oriented photoactive material. The oriented photoactive material may be employed in the system to harvest sunlight and produce energy necessary for water splitting. The system may also include a light polarization system and elements necessary to collect, transfer, and store hydrogen and oxygen, for subsequent transformation into electrical energy.

19 Claims, 12 Drawing Sheets

SYSTEM FOR HARVESTING ORIENTED LIGHT—WATER SPLITTING

CROSS-REFERENCE TO RELATED APPLICATIONS

The disclosure here described is related to the invention disclosed in the U.S. application Ser. No. 13/722,355, filed Dec. 20, 2012, entitled "Photo-catalytic Systems for the Production of Hydrogen".

BACKGROUND

1. Technical Field

The present disclosure relates to water splitting systems. In particular, the present disclosure relates to hydrogen generation systems in which a light source is used for the photocatalytic decomposition of water.

2. Background Information

Because a chemical energy carrier offers the only practical means for storing large amounts of energy, hydrogen is a primary candidate for future energy storage. Although many methods exist for the production of hydrogen, most of those methods have problems regarding production efficiency and costs.

Photoelectric materials are candidates for an efficient method for producing hydrogen. These methods generally require strong UV/visible light absorption; high chemical stability in the dark and under illumination; suitable band edge alignment to enable reduction/oxidation of water; efficient charge transport in the semiconductor; and low over potentials for the reduction/oxidation reactions.

One attractive technology for producing hydrogen employs photo-electrochemical devices (PEC cells) for water splitting—cleaving water molecules into their components, hydrogen and oxygen. The overall efficiency of such PEC cells would be determined by the basic working principles and properties of photoactive materials. The tremendous progress made in the field of nanostructured materials may provide new opportunities for efficiently harnessing this technique.

Water Splitting with Nano-Sized Photocatalysts

As distinct from bulk photocatalysts, realized as thin films on conducting substrates, water splitting with nano-sized photocatalysts simply utilizes a photocatalyst material immersed in water. The principles of photocatalytic water splitting require high surface areas for electron excitation and collection, and the use of oriented nanocatalysts, which offer high surface to volume ratios and high light harvesting efficiencies, is a favorable match. Semiconductor nanocrystals can improve photocatalysis through the combined effects of quantum confinement and unique surface morphologies. A wide range of metallic nanoparticles can be prepared with adequate control over their size and shape. Nanoparticles can serve as building blocks for complex thin film structures. In particular, they self-assemble into ordered arrays—monolayers and multilayers—under specific conditions.

For preparation of such ordered nanoparticle arrays various deposition methods have been elaborated up to now. As a result of quantum confinement, materials that are not suitable semiconductors in bulk form due to insufficient energetic electrons or holes can be utilized on a nano scale. Surface and orientation modification of nano-sized catalysts may affect redox potentials and may be used to enhance the efficiency of charge transfer and charge separation. Furthermore, the problem of poor carrier transport in some bulk materials can be significantly alleviated on a nano scale, as the distance that photo generated carriers have to travel to reach the surface is significantly decreased.

There is still a need for improvement in this field, including the need for development of improved materials and devices that may operate with higher energy conversion efficiency.

SUMMARY

According to various embodiments, a system and method are provided for splitting water to produce hydrogen and oxygen employing oriented photocatalyst semiconductor surfaces. The hydrogen and oxygen produced may be stored to be thereafter used as a fuel to power one or more applications. The system includes oriented semiconductor nanocrystals capped with inorganic capping agents, creating an oriented photocatalytic capped colloidal nanocrystal (PCCN) composition that may be deposited on a substrate and treated to form a solid matrix of photoactive material to be used as an oriented photocatalytic semiconductor surfaces. The system may employ reflective or polarizing surfaces to collect solar energy and orient the light rays for an increased absorption and energy conversion on oriented photocatalytic surfaces.

In one aspect of the present disclosure, a method for producing PCCN may synthesize semiconductor nanocrystals and substitute organic capping agents with inorganic capping agents.

In another aspect of the disclosure, the PCCN composition may be deposited on a substrate as thin or bulk films by a variety of techniques known in the art, producing short or long range ordering of PCCN. Subsequently, an application of orientational methods known in the art may be applied to the photoactive material. Additionally, the deposited PCCN composition can be thermally treated to anneal and form inorganic matrices with embedded photocatalytic capped colloidal nanocrystals. In another aspect of the disclosure, a light polarizing system may be included. The system configuration may change depending on the final user needs.

A further aspect of the present disclosure is a process for splitting water molecules, employing the oriented photocatalyst semiconductor surfaces set out above. The photoactive material produced may be submerged in a reaction vessel filled with water so that a water splitting process may take place. Production of charge carriers may be triggered by photo-excitation from linearly-polarized light. When electrons are in conduction band of PCCN, they may reduce hydrogen molecules from water, while oxygen molecules may be oxidized by holes left behind in the valence band. The excited electrons may reduce water molecules and form hydrogen gas.

Semiconductor nanocrystals in the oriented photoactive material may absorb the polarized light at different tunable wavelengths as a function of the particle size and generally at shorter wavelengths from the bulk material. Materials of the semiconductor nanocrystals may be selected in accordance with the irradiation wavelength. According to various embodiments, PCCN may exhibit a plurality of suitable configurations, including sphere, tetrapod, and core/shell, among others. The structure of the inorganic capping agents may speed up the reaction by quickly transferring charge carriers sent by semiconductor nanocrystals to water, so that the redox reaction and consequent water splitting take place at a faster and more efficient rate and at the same time inhibiting electron-hole recombination. As a result of employing the oriented photoactive material of the present disclosure in combination with a polarization system of light, greater sunlight energy extraction may be achieved. In addition, semiconductor nanocrystals may provide for higher surface area available for the absorption of light.

In one embodiment, a method of water splitting comprises: forming photocatalytic capped colloidal nanocrystals, wherein each photocatalytic capped colloidal nanocrystal includes a first semiconductor nanocrystal capped with a first inorganic capping agent; depositing the formed photocatalytic capped colloidal nanocrystals onto a substrate; orienting the photocatalytic capped colloidal nanocrystals, wherein the oriented photocatalytic capped colloidal nanocrystals are included in a reaction vessel; absorbing irradiated light with an energy equal to or greater than the band gap of the semiconductor nanocrystals by the photocatalytic capped colloidal nanocrystals to create charge carriers in a conduction band of the photocatalytic capped colloidal nanocrystals and holes in a valence band of the photocatalytic capped colloidal nanocrystals; passing water through the reaction vessel so that the water reacts with the photocatalytic capped colloidal nanocrystals and forms hydrogen gas and oxygen gas, wherein the charge carriers in the conduction band reduce hydrogen molecules from the water and the holes oxidize oxygen molecules from the water; and collecting the hydrogen gas and the oxygen gas in a reservoir that includes a hydrogen permeable membrane and an oxygen permeable membrane.

In another embodiment, a water splitting system comprises: an oriented photoactive material, wherein the oriented photoactive material includes oriented photocatalytic capped colloidal nanocrystals; a reaction vessel housing the oriented photoactive material and configured to receive water through a nozzle and facilitate a water splitting reaction when the water reacts with the photocatalytic capped colloidal nanocrystals, wherein the reaction occurs when the photocatalytic capped colloidal nanocrystals absorb irradiated light; a collector connected to the reaction vessel and comprising a reservoir that includes a hydrogen permeable membrane and an oxygen permeable membrane for collecting hydrogen gas and oxygen gas.

In another embodiment, a light polarization system comprises: a tracking mirror configured to collect and polarize sunlight; a sun tracking system connected to the tracking mirror and configured to move the tracking mirror such that the tracking mirror collects sunlight at Brewster's angle based on the movement of the sun; a first steering mirror configured to reflect polarized sunlight received from the tracking mirror, wherein the first steering mirror is capable of changing its relative position based on the direction that the tracking mirror is reflecting the sunlight; a second steering mirror configured to reflect directed sunlight received from the first steering mirror, wherein the second steering mirror is capable of changing its relative position based on the direction that the first steering mirror is reflecting the sunlight; and an oriented photocatalytic material configured to receive sunlight directed by the second steering and initiate a water splitting reaction, wherein the oriented photocatalytic material receives sunlight at an optimal angle by the movement of the tracking mirror, the first steering mirror, and the second steering mirror.

Numerous other aspects, features of the present disclosure may be made apparent from the following detailed description, taken together with the drawing figures.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the invention. In the figures, reference numerals designate corresponding parts throughout the different views.

DETAILED DESCRIPTION

Figure 1:
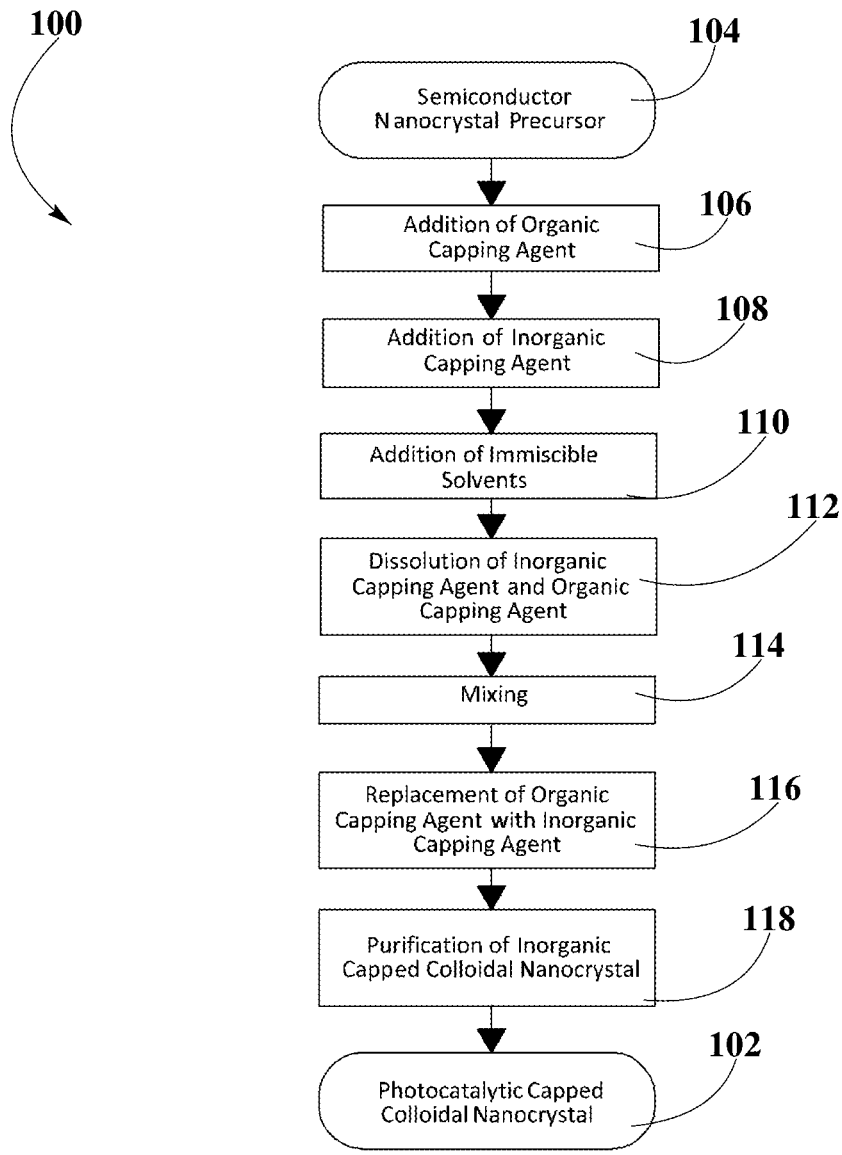
FIG. 1 is a flowchart of a method for forming a composition of PCCN, according to an embodiment.

Reference will now be made in detail to the preferred embodiments, examples of which are illustrated in the accompanying drawings. The embodiments described above are intended to be exemplary. One skilled in the art recognizes that numerous alternative components and embodiments that may be substituted for the particular examples described herein and still fall within the scope of the invention.

A system for harvesting oriented light is disclosed. Disclosed system may include oriented photocatalytic semiconductor surfaces that may be used for a high efficiency light harvesting and, according to an embodiment, may be employed in water splitting processes.

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

DEFINITIONS

As used here, the following terms have the following definitions:

"Alignment ligand" refers to components that interact with one or more nanostructures and can be used to order, orient and/or align the nanostructures associated.

"Semiconductor nanocrystals" refers to particles sized between about 1 and about 100 nanometers made of semiconducting materials.

"Electric dipole moment" refers to the separation of positive and negative charge on a system.

"Electron-hole pairs" refers to charge carriers that are created when an electron acquires energy sufficient to move from a valence band to a conduction band and creates a free hole in the valence band, thus initiating a process of charge separation.

"Inorganic capping agent" refers to semiconductor particles that cap semiconductor nanocrystals.

"Nanocrystal growth" refers to a synthetic process including the reacting of component precursors of a semiconductor crystal in the presence of a stabilizing organic ligand, taking into account process parameters in order to control the growth and physical or chemical properties of the nanocrystals.

"Orientation" refers to the rotation needed to bring a nanocrystal into position or alignment so that its longitudinal axis has a desired angle.

"Photoactive material" refers to a substance capable of a chemical or physical change in response to light.

"Polarization" refers to a process in which waves of light are restricted to certain directions of vibration.

"Transition dipole moment" refers to the axis of a system that may interact with light of a certain polarization.

DESCRIPTION OF DRAWINGS

Method for Growing Oriented Semiconductor Nanocrystals

Controlling the orientation of the semiconductor nanocrystals in a substrate may allow controlling different parts of the light spectrum in the same system, therefore, increasing the efficiency in the light harvesting process. A homogeneous orientation of the nanocrystals upon a substrate may be achieved employing a variety of state of the art methods, such as template-driven seeded growth, electric fields application or other appropriate orientational forces. The orientation of the nanocrystals may be along either 1 crystallographic axis (1D orientation), or orientation along 2 axes (2D orientation). Once orientation is fixed along 2 axes, the 3rd axis may be already fixed for a rigid structure.

In an embodiment, semiconductor nanocrystals may be grown employing a known in the art method for template-driven seeded growth. Seeded growth refers to methods for growing crystals in which a seed crystal may be used to initiate crystal lattice growth and elongation (as opposed to forcing a nucleation event before crystal growth may be observed). In an embodiment, the seed crystal may be freely dispersed in a solution, or may be deposited on a substrate. In another embodiment, the seed crystal may be the substrate itself, or may be composed of the same material as the intended semiconductor nanocrystal. In another embodiment, the seed crystal may be composed of another crystalline material with the proper crystal lattice structure, atomic spacing, and surface energy to promote further crystal growth. For example, GaSb has shown to be an appropriate surface for semiconductor growth. In this scenario, a GaSb single nanocrystal surface could be used to seed the growth of a semiconductor nanocrystal using molecular beam epitaxy (MBE), or chemical beam epitaxy (CBE) so that nanocrystal growth is templated by the substrate crystal structure. Photocatalyst layers would then be grown on top of the aligned and oriented semiconductor nanocrystal.

The seeded growth method may have the benefit of 1) lowering the activation energy required for crystal growth to occur, as well as other reaction parameters, such as monomer concentration and reaction temperature, and 2) allowing a degree of control over deposition density, growth rate, and orientation dispersion to yield a highly uniform and oriented nanocrystal surface with 2D/3D orientation.

The morphologies of semiconductor nanocrystals may include nanorods, nanoplates, nanowires, dumbbell-like nanoparticles, and dendritic nanomaterials, among others. Each morphology may include an additional variety of shapes such as spheres, cubes, tetrahedra (tetrapods), among others.

To modify optical properties as well as to enhance charge carriers mobility, semiconductor nanocrystals may be capped by inorganic capping agents in polar solvents instead of organic capping agents. In those embodiments, inorganic capping agents may act as photocatalysts to facilitate a photocatalytic reaction on the surface of semiconductor nanocrystals. Optionally, semiconductor nanocrystals may be modified by the addition of not one but two different inorganic capping agents. In that instance, a reduction inorganic capping agent is first employed to facilitate the reduction half-cell reaction; then, an oxidation inorganic capping agent facilitates the oxidation half-cell reaction. Inorganic capping agents may be neutral or ionic, or they may be discrete species, either linear or branched chains, or two-dimensional sheets. Ionic inorganic capping agents are commonly referred to as salts, pairing a cation and an anion. The portion of the salt specifically referred to as an inorganic capping agent is the ion that displaces the organic capping agent.

Method for Forming Composition of Photocatalytic Capped Colloidal Nanocrystals (PCCN)

FIG. 1 shows a flow diagram of a method 100 for forming a composition of PCCN 102, according to an embodiment. PCCN 102 may be synthesized following accepted protocols, and may include one or more semiconductor nanocrystals 104 and one or more inorganic capping agents.

Method 100 for forming a composition of PCCN 102 may include a first step where semiconductor nanocrystals 104 may be grown by reacting as semiconductor nanocrystal 104 precursors in the presence of an organic solvent, here referred to as organic capping agent, by the addition of the organic capping agent 106. Additionally, the long organic chains radiating from organic capping agents on the surface of semiconductor nanocrystal 104 precursors may assist in the suspension and/or solubility of semiconductor nanocrystal 104 precursors in a solvent. The chemistry of capping agents may control several system parameters, for example, the size of semiconductor nanocrystal 104 precursors, growth rate or shape, the dispersability in various solvents and solids, and even the excited state lifetimes of charge carriers in semiconductor nanocrystal 104 precursors. The flexibility of synthesis is demonstrated by the fact that often one capping agent may be chosen for its growth control properties, and then later a different capping agent may be substituted to provide a more suitable interface or to modify optical properties or charge carrier mobility.

For the substitution of organic capping agents with inorganic capping agents, organic capped semiconductor nanocrystals 104 in the form of a powder, suspension, or a colloidal solution, may be mixed by the addition of inorganic capping agents 108, causing a reaction of organic capped semiconductor nanocrystals 104 with inorganic capping agents. This reaction rapidly produces insoluble and intractable materials. Afterwards, an addition of immiscible solvents 110 may be made causing the dissolution of organic capping agents and inorganic capping agents 112. These two solutions may then be mixed 114, by combining and stirring them for about 10 minutes, after which a complete transfer of organic capped semiconductor nanocrystals 104 from the non-polar solvent to the polar solvent may be observed. During this exchange, organic capping agents are released. Generally, inorganic capping agents may be dissolved in a polar solvent, while organic capped semiconductor nanocrystals 104 may be dissolved in an immiscible, generally non-polar, solvent. The addition of immiscible solvents 110 may be made to control the reaction, facilitating a rapid and complete replacement of organic capping agents with inorganic capping agents 116

Organic capped semiconductor nanocrystals 104 may react with inorganic capping agents at or near the solvent boundary, where a portion of the organic capping agent may be exchanged/replaced with a portion of the inorganic capping agent. Thus, inorganic capping agents may displace organic capping agents from the surface of semiconductor nanocrystal 104 precursors, and inorganic capping agents may bind to that. This process continues until equilibrium is established between inorganic capping agents and the free inorganic capping agents. Preferably, the equilibrium favors inorganic capping agents. All the steps described above may be carried out in a nitrogen environment inside a glove box.

Subsequently, an isolation procedure, such as the precipitation of inorganic product, may be required for the purification of inorganic capped semiconductor nanocrystals 118 to form a PCCN 102. That precipitation permits one of ordinary skill to wash impurities and/or unreacted materials out of the precipitate. Such isolation may allow for the selective application of PCCN 102.

Neither the morphology nor the size of semiconductor nanocrystal 104 precursors inhibits a method 100 for forming composition of PCCN 102 using the semiconductor nanocrystal 104 precursors; rather, the selection of morphology and size of semiconductor nanocrystal 104 precursors may permit the tuning and control of the properties of PCCN 102.

Examples of semiconductor nanocrystals 104 may include the following: AlN, AlP, AlAs, Ag, Au, Bi, $Bi_2S_3$, $Bi_2Se_3$, $Bi_2Te_3$, CdS, CdSe, CdTe, Co, CoPt, $CoPt_3$, Cu, $Cu_2S$, $Cu_2Se$, $CuInSe_2$, $CuIn_{(1-x)}Ga_x(S,Se)_2$, $Cu_2ZnSn(S,Se)_4$, Fe, FeO, $Fe_2O_3$, $Fe_3O_4$, FePt, GaN, GaP, GaAs, GaSb, GaSe, Ge, HgS, HgSe, HgTe, InN, InP, InSb, InAs, Ni, PbS, PbSe, PbTe, Pd, Pt, Ru, Rh, Si, Sn, ZnS, ZnSe, ZnTe, and mixtures of those compounds. Additionally, examples of applicable semiconductor nanocrystals 104 may further include core/shell semiconductor nanocrystals 104 such as Au/PbS, Au/PbSe, Au/PbTe, Ag/PbS, Ag/PbSe, Ag/PbTe, Pt/PbS, Pt/PbSe, Pt/PbTe, Au/CdS, Au/CdSe, Au/CdTe, Ag/CdS, Ag/CdSe, Ag/CdTe, Pt/CdS, Pt/CdSe, Pt/CdTe, Au/FeO, $Au/Fe_2O_3$, $Au/Fe_3O_4$, Pt/FeO, $Pt/Fe_2O_3$, $Pt/Fe_3O_4$, FePt/PbS, FePt/PbSe, FePt/PbTe, FePt/CdS, FePt/CdSe, FePt/CdTe, CdSe/CdS, CdSe/ZnS, InP/CdSe, InP/ZnS, InP/ZnSe, InAs/CdSe, and InAs/ZnSe; nanorods such as CdSe; core/shell nanorods such as CdSe/CdS; nano-tetrapods such as CdTe, and core/shell nano-tetrapods such as CdSe/CdS.

Examples of polar solvents may include 1,3-butanediol, acetonitrile, ammonia, benzonitrile, butanol, dimethylacetamide, dimethylamine, dimethylethylenediamine, dimethylformamide, dimethylsulfoxide (DMSO), dioxane, ethanol, ethanolamine, ethylenediamine, ethyleneglycol, formamide (FA), glycerol, methanol, methoxyethanol, methylamine, methylformamide, methylpyrrolidinone, pyridine, tetramethylethylenediamine, triethylamine, trimethylamine, trimethylethylenediamine, water, and mixtures thereof.

Examples of non-polar or organic solvents may include pentane, pentanes, cyclopentane, hexane, hexanes, cyclohexane, heptane, octane, isooctane, nonane, decane, dodecane, hexadecane, benzene, 2,2,4-trimethylpentane, toluene, petroleum ether, ethyl acetate, diisopropyl ether, diethyl ether, carbon tetrachloride, carbon disulfide, and mixtures thereof; provided that organic solvent is immiscible with polar solvent. Other immiscible solvent systems that are applicable may include aqueous-fluorous, organic-fluorous, and those using ionic liquids.

Polar solvents such as spectroscopy grade FA, and DMSO, anhydrous, 99.9% may be supplied by Sigma-Aldrich. Suitable colloidal stability of semiconductor nanocrystals 104 dispersions is mainly determined by the solvent dielectric constant, which may range between about 106 to about 47, with 106 being preferred.

Preferred inorganic capping agents for PCCN 102 may include polyoxometalates and oxometalates, such as tungsten oxide, iron oxide, gallium zinc nitride oxide, bismuth vanadium oxide, zinc oxide, titanium dioxide, among others.

Inorganic capping agents may include metals selected from transition metals. Additionally, inorganic capping agent may be Zintl ions. As used here, Zintl ions may refer to homopolyatomic anions and heteropolyatomic anions that may have intermetallic bonds between the same or different metals of the main group, transition metals, lanthanides, and/or actinides. Examples of Zintl ions may include: $As_3^{3-}$, $As_4^{2-}$, $As_5^{3-}$, $As_7^{3-}$, $Ae_{11}^{3-}$, $AsS_3^{3-}$, $As_2Se_6^{3-}$, $As_2Te_6^{3-}$, $As_{10}Te_3^{2-}$, $Au_2Te_4^{2-}$, $Au_3Te_4^{3-}$, $Bi_3^{3-}$, $Bi_4^{2-}$, $Bi_5^{3-}$, $GaTe_2^{-}$, $Ge_9^{2-}$, $Ge_9^{4-}$, $Ge_2S_6^{4-}$, $HgSe_2^{2-}$, $Hg_3Se_4^{2-}$, $In_2Se_4^{2-}$, $In_2Te_4^{2-}$, $Ni_5Sb_{17}^{4-}$, $Pb_5^{2-}$, $Pb_7^{4-}$, $Pb_9^{4-}$, $Pb_2Sb_2^{2-}$, $Sb_3^{3-}$, $Sb_4^{2-}$, $Sb_7^{3-}$, $SbSe_4^{3-}$, $SbSe_4^{5-}$, $SbTe_4^{5-}$, $Sb_2Se_{3-}$, $Sb_2Te_5^{4-}$, $Sb_2Te_7^{4-}$, $Sb_4Te_4^{4-}$, $Sb_9Te_6^{3-}$, $Se_2^{2-}$, $Se_3^{2-}$, $Se_4^{2-}$, $Se_{5,6}^{2-}$, $Se_6^{2-}$, $Sn_5^{2-}$, $Sn_9^{3-}$, $Sn_9^{4-}$, $SnS_4^{4-}$, $SnSe_4^{4-}$, $SnTe_4^{4-}$, $SnS_4Mn_2^{5-}$, $SnS_2S_6^{4-}$, $Sn_2Se_6^{4-}$, $Sn_2Te_6^{4-}$, $Sn_2Bi_2^{2-}$, $Sn_8Sb^{3-}$, $Te_2^{2-}$, $Te_3^{2-}$, $Te_4^{2-}$, $Tl_2Te_2^{2-}$, $TlSn_8^{3-}$, $TlSn_9^{5-}$, $TlSn_9^{3-}$, $TlTe_2^{2-}$, mixed metal $SnS_4Mn_2^{5-}$, among others. The positively charged counter ions may be alkali metal ions, ammonium, hydrazinium, tetraalkylammonium, among others.

Further embodiments may include other inorganic capping agents. For example, inorganic capping agents may include molecular compounds derived from $CuInSe_2$, $CuIn_xGa_{1-x}Se_2$, $Ga_2Se_3$, $In_2Se_3$, $In_2Te_3$, $Sb_2S_3$, $Sb_2Se_3$, $Sb_2Te_3$, and ZnTe.

Still further, inorganic capping agents may include mixtures of Zintl ions and molecular compounds.

These inorganic capping agents further may include transition metal chalcogenides, examples of which may include the tetrasulfides and tetraselenides of vanadium, niobium, tantalum, molybdenum, tungsten, and rhenium, and the tetratellurides of niobium, tantalum, and tungsten. These transition metal chalcogenides may further include the monometallic and polymetallic polysulfides, polyselenides, and mixtures thereof, such as $MoS(Se_4)_2^{2-}$, $Mo_2S_6^{2-}$, among others.

Method 100 may be adapted to produce a wide variety of PCCN 102. Adaptations of these method 100 may include adding two different inorganic capping agents to a single semiconductor nanocrystals 104 (e.g., $Au.(Sn_2S_6;In_2Se_4)$; $Cu_2Se.(In_2Se_4;Ga_2Se_3)$), adding two different semiconductor nanocrystals 104 to a single inorganic capping agent (e.g., $(Au;CdSe).Sn_2S_6$; $(Cu_2Se;ZnS).Sn_2S_6$), adding two different semiconductor nanocrystals 104 to two different inorganic capping agents (e.g., (Au;CdSe).($Sn_2S_6$;$In_2Se_4$)), and/or additional multiplicities.

The sequential addition of inorganic capping agents to semiconductor nanocrystals 104 may be possible under the disclosed method 100. Depending, for example, upon concentration, nucleophilicity, bond strength between capping agents and semiconductor nanocrystal 104, and bond strength between semiconductor nanocrystal 104 face dependent capping agent and semiconductor nanocrystal 104, inorganic capping of semiconductor nanocrystals 104 may be manipulated to yield other combinations.

Suitable PCCN 102 may include $Au.AsS_3$, $Au.Sn_2S_6$, $Au.SnS_4$, $Au.Sn_2Se_6$, $Au.In_2Se_4$, $Bi_2S_3.Sb_2Te_5$, $Bi_2S_3.Sb_2Te_7$, $Bi_2Se_3.Sb_2Te_5$, $Bi_2Se_3.Sb_2Te_7$, $CdSe.Sn_2S_6$, $CdSe.Sn_2Te_6$, $CdSe.In_2Se_4$, $CdSe.Ge_2S_6$, $CdSe.Ge_2Se_3$, $CdSe.HgSe_2$, $CdSe.ZnTe$, $CdSe.Sb_2S_3$, $CdSe.SbSe_4$, $CdSe.Sb_2Te_7$, $CdSe.In_2Te_3$, $CdTe.Sn_2S_6$, $CdTe.Sn_2Te_6$, $CdTe.In_2Se_4$, $Au/PbS.Sn_2S_6$, $Au/PbSe.Sn_2S_6$, $Au/PbTe.Sn_2S_6$, $Au/CdS.Sn_2S_6$, $Au/CdSe.Sn_2S_6$, $Au/CdTe.Sn_2S_6$, $FePt/PbS.Sn_2S_6$, $FePt/PbSe.Sn_2S_6$, $FePt/PbTe.Sn_2S_6$, $FePt/CdS.Sn_2S_6$, $FePt/CdSe.Sn_2S_6$, $FePt/CdTe.Sn_2S_6$, $Au/PbS.SnS_4$, $Au/PbSe.SnS_4$, $Au/PbTe.SnS_4$, $Au/CdS.SnS_4$, $Au/CdSe.SnS_4$, $Au/CdTe.SnS_4$, $FePt/PbS.SnS_4$ $FePt/PbSe.SnS_4$, $FePt/PbTe.SnS_4$, $FePt/CdS.SnS_4$, $FePt/CdSe.SnS_4$, $FePt/CdTe.SnS_4$, $Au/PbS.In_2Se_4$ $Au/PbSe.In_2Se_4$, $Au/PbTe.In_2Se_4$, $Au/CdS.In_2Se_4$, $Au/CdSe.In_2Se_4$, $Au/CdTe.In_2Se_4$, $FePt/PbS.In_2Se_4$ $FePt/PbSe.In_2Se_4$, $FePt/PbTe.In_2Se_4$, $FePt/CdS.In_2Se_4$, $FePt/CdSe.In_2Se_4$, $FePt/CdTe.In_2Se_4$, $CdSe/CdS.Sn_2S_6$, $CdSe/CdS.SnS_4$, $CdSe/ZnS.SnS_4$,$CdSe/CdS.Ge_2S_6$, $CdSe/CdS.In_2Se_4$, $CdSe/ZnS.In_2Se_4$, $Cu.In_2Se_4$, $Cu_2Se.Sn_2S_6$, $Pd.AsS_3$, $PbS.SnS_4$, $PbS.Sn_2S_6$, $PbS.Sn_2Se_6$, $PbS.In_2Se_4$, $PbS.Sn_2Te_6$, $PbS.AsS_3$, $ZnSe.Sn_2S_6$, $ZnSe.SnS_4$, $ZnS.Sn_2S_6$, and $ZnS.SnS_4$.

As used here, the denotation $Au.Sn_2S_6$ may refer to an Au semiconductor nanocrystal 104 capped with a $Sn_2S_6$ inorganic capping agent. Charges on the inorganic capping agent are omitted for clarity. This notation [semiconductor nanocrystal 104].[inorganic capping agent] is used throughout this description. The specific percentages of semiconductor nanocrystals 104 and inorganic capping agents may vary between different types of PCCN 102.

Structure of PCCN

Figure 2:
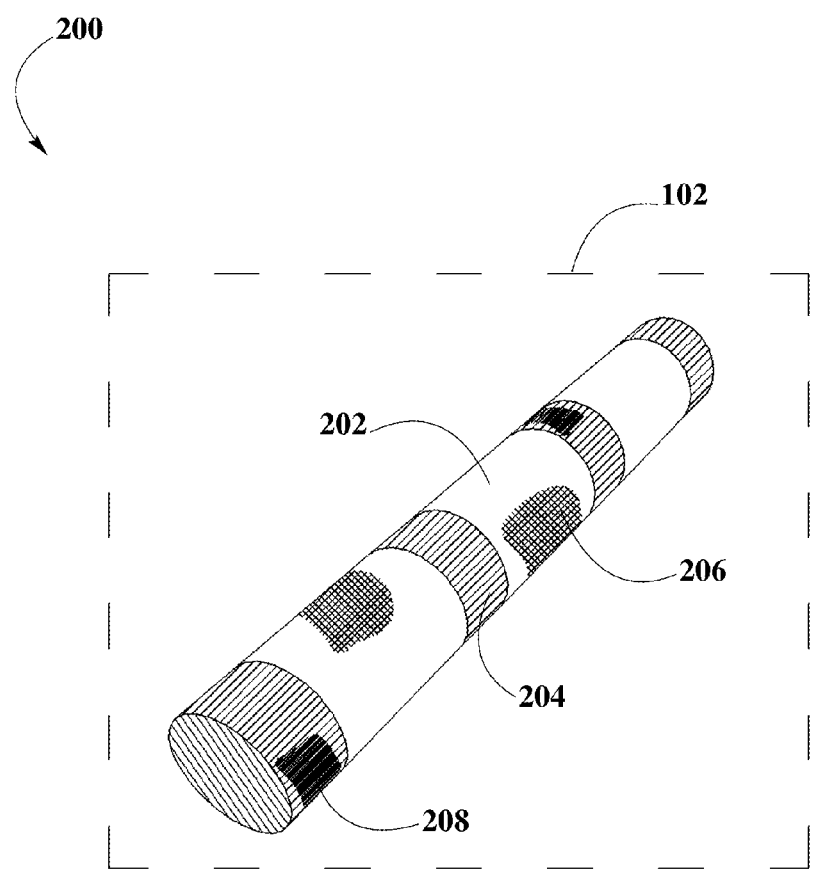
FIG. 2 shows an embodiment of nanorod configuration of PCCN.

FIG. 2 shows an embodiment of PCCN 102 in nanorod configuration 200. According to an embodiment, there may be three ZnS regions and four Cu regions as first semiconductor nanocrystal 202 and second semiconductor nanocrystal 204, respectively, where the three first semiconductor nanocrystal 202 may be larger than each of the four second semiconductor nanocrystal 204 of nanorod configuration 200. In other embodiments, the different regions with different materials may have the same lengths, and there can be any suitable number of different regions. The number of regions per nanorod superlattice in nanorod configuration 200 may vary according to the length of the nanorod.

First semiconductor nanocrystal 202 and second semiconductor nanocrystal 204 may be capped with first inorganic capping agent 206 and second inorganic capping agent 208, respectively. First inorganic capping agent 206 may include $ReO_2$, while $W_2O_3$ may be employed as second inorganic capping agent 208. Second semiconductor nanocrystal 204 may be placed at the end points of nanorod configuration 200.

Other suitable configurations for PCCN 102 may be carbon nanotube, nanowire, nanospring, nanodendritic, spherical, tetrapod, core/shell, and graphene configuration, among others.

Alignment Process for Forming Oriented Photoactive Material

When a PCCN 102 interacts with an electromagnetic wave of frequency, i.e. when a PCCN 102 is being hit by photons, it can undergo a transition from an initial to a final state of energy difference through the coupling of the electromagnetic field to the transition dipole moment (TDM). The process of single photon absorption is characterized by the TDM. The TDM is a vector and has to do with the differences in electric charge distribution between an initial and final state of a PCCN 102. When this transition is from a lower energy state to a higher energy state, this results in the absorption of a photon. A transition from a higher energy state to a lower energy state, results in the emission of a photon.

The TDM may describe in which direction the electric charge within a PCCN 102 shifts during absorption of a photon. The amplitude of TDM is the transition moment between the initial (i) and final (f) states, and may be calculated as $<f|V|i>$, where "f" may be the wavefunction of the final state of PCCN 102, "i" may be the wavefunction of the initial state of PCCN 102, "V" may be the disturbance or transition dipole moment=mu*E (where "mu" may be the dipole moment of PCCN 102 in initial state, and "E" may be the electric part of the electromagnetic field). V is the electric dipole moment operator, a vector operator that is the sum of the position vectors of all charged particles weighted with their charge.

The TDM direction in the molecular framework defines the direction of transition polarization, and its square determines the strength of the transition.

Figure 3:
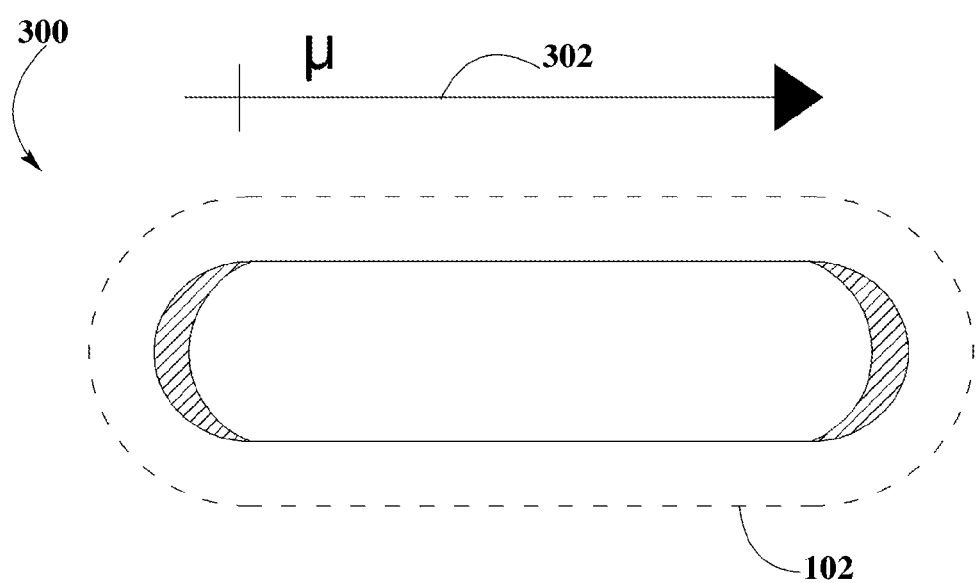
FIG. 3 illustrates the principle of the transition dipole moment in a PCCN, according to an embodiment

FIG. 3 illustrates dipole moment characterization 300 in PCCN 102, according to an embodiment, describing the axis of the nanocrystal along which the electrons interact with the electromagnetic field of an incident photon. The TDM 302 relates the interaction of PCCN 102 to the polarization of incident light.

TDM 302 is a vector in the molecular framework, characterized both by its direction and its probability. The absorption probability for linearly polarized light is proportional to the cosine square of the angle between the electric vector of the electromagnetic wave and TDM 302; light absorption may be maximized if they are parallel, and no absorption may occur if they are perpendicular.

Therefore, by controlling the orientation of PCCN 102 employed in a light harvesting system, an increase in the efficiency of light absorption and hence, an increase in the energy conversion may be achieved. For this purpose oriented photoactive materials may be formed applying orientational forces to PCCN 102 during deposition and/or after they are deposited onto a suitable substrate.

Alignment Methods

In an embodiment, semiconductor nanocrystals 104 may be deposited and thermally treated on a suitable substrate, employing known in the art suitable methods (e.g. spraying deposition and annealing methods). For these methods, suitable substrates may include non-porous substrates and porous substrates, which may additionally be optically transparent in order to allow PCCN 102 to receive more light. Suitable non-porous substrates may include polydiallyldimethylammonium chloride (PDDA), polyethylene terephthalate (PET), and silicon, while suitable porous substrates may include $TiO_2$, glass frits, fiberglass cloth, porous alumina, and porous silicon. Suitable porous substrates may additionally exhibit a pore size sufficient for a gas to pass through at a constant flow rate. Suitable substrates may be planar or parabolic, individually controlled planar plates, or a grid work of plates.

According to an embodiment, semiconductor nanocrystals 104 may be applied to the substrate by means of a spraying device during a period of time depending on preferred thickness of semiconductor nanocrystal 104 composition applied on the substrate.

Figure 4:
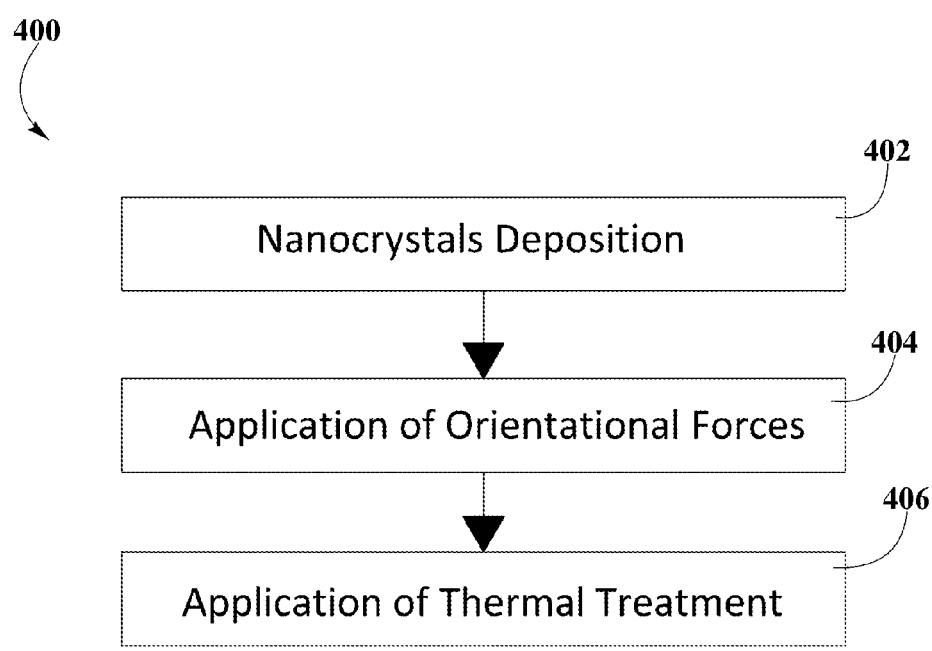
FIG. 4 is a flowchart of a method for forming oriented photocatalyst semiconductor surfaces, according to an embodiment.

FIG. 4 is a flowchart of alignment method 400 for forming oriented photocatalyst semiconductor surfaces, according to an embodiment. Alignment method 400 for forming oriented photocatalyst semiconductor surfaces may include a deposition 402 of PCCN 102 on a suitable substrate, such as substrates mentioned in FIG. 3.

According to an embodiment, PCCN 102 may be deposited on the substrate by means of a spraying device during a period of time depending on preferred thickness of PCCN 102 composition deposited on the substrate. As a result of the spraying deposition, a photoactive material may be formed.

Other deposition 402 methods of PCCN 102 may include plating, chemical synthesis in solution, chemical vapor deposition (CVD), spin coating, plasma enhanced chemical vapor deposition (PECVD), laser ablation, thermal evaporation, molecular beam epitaxy, electron beam evaporation, pulsed laser deposition (PLD), sputtering, reactive sputtering, atomic layer deposition, sputter deposition, reverse Langmuir-Blodgett technique, electrostatic deposition, spin coating, inkjet deposition, laser printing (matrices), and the like.

Subsequently, PCCN 102 within the photoactive material may be oriented by the application of orientational forces 404. Afterwards, PCCN 102 may pass through a thermal treatment 406 employing a convection heater, with temperatures less than between about 200 to about 350° C., to produce crystalline films from the PCCN 102. A thermal treatment 406 may yield, for example, ordered arrays of PCCN 102 within an inorganic matrix, hetero-alloys, or alloys.

Figure 5:
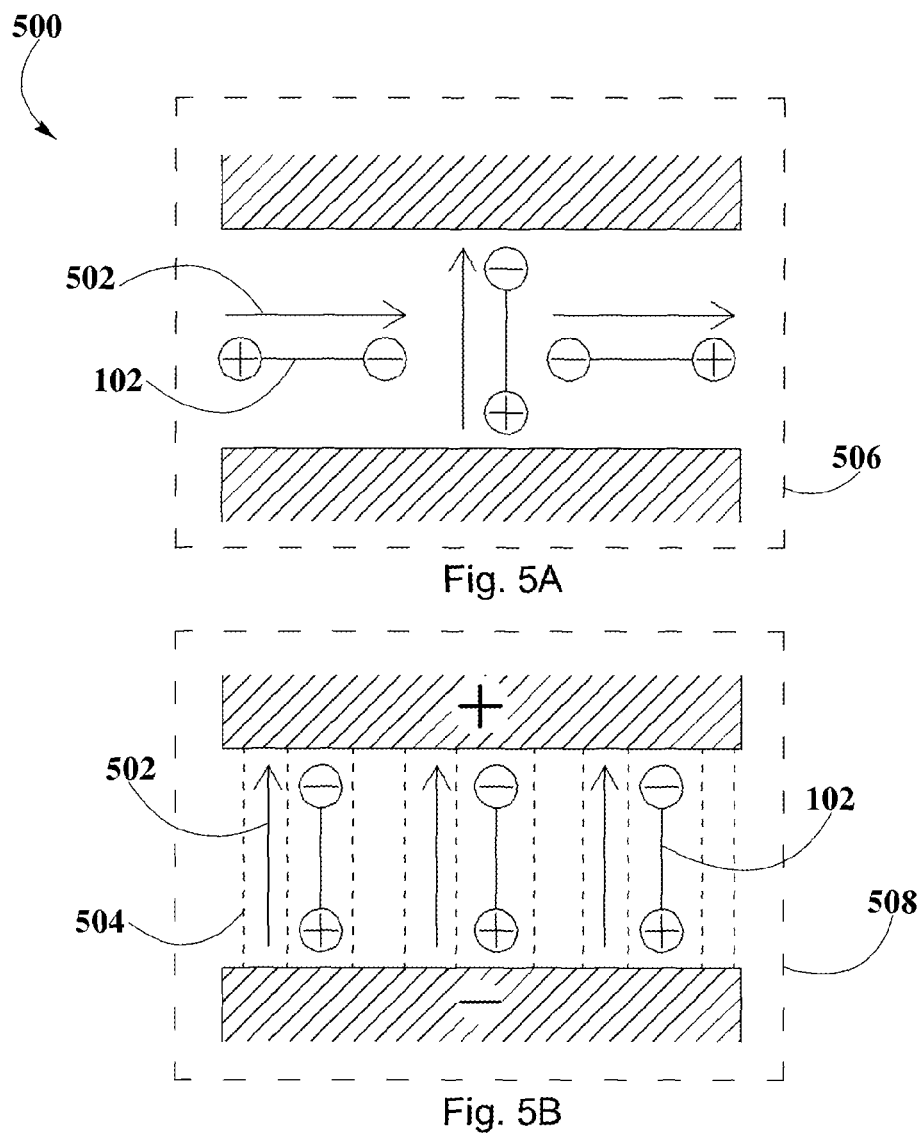
FIG. 5 depicts an alignment process employing electric fields, according to an embodiment.

FIG. 5 depicts alignment process 500 employing electric fields to orient the electric dipole moment (EDM 502) of PCCN 102, depicted by electric field lines 504, which might be an example of application of orientational forces 404.

Molecules including more than one type of atoms generally may have the tendency to form bonds where electrons are not shared equally. In this kind of molecules a region with high electron density and a region with low electron density may be found.

PCCN 102 may include atoms of different electronegativity, which makes them polar molecules, as such they may include a positively charged region, which may include a lower concentration of atoms with low electronegativity, and a negatively charged region, which may have a higher concentration of atoms with high electronegativity. Accordingly, electron density may be higher in the space surrounding negatively charged region and lower in the spacer surrounding positively charged region, while PCCN 102 molecules remain neutral as a whole. Negatively charged region may include a negatively charged center, about which the negative charge is centered. Similarly, positively charged region may include a positive charged center, about which the positive charge is centered. If the locations of negatively charged center and positive charged center are not coincident, PCCN 102 molecules include an EDM 502. The magnitude of EDM 502 may be equal to the distance between positive charged center and negatively charged center multiplied by the magnitude of the charge at either charge region (positively charged region or negatively charged region). The direction of EDM 502 may depend on the structure and composition of PCCN 102, generally pointing towards negatively charged region.

In an embodiment, the photoactive material 506, including PCCN 102, may be exposed to an external electric field. The EDM 502 of PCCN 102 may interact with the external electric field, causing PCCN 102 to rotate in such a way that the energy of EDM 502 in external electric field may be minimized. In many cases, this means that EDM 502 of PCCN 102 may be parallel to the electric field lines 504 and form an oriented photoactive material 508 which may be employed as an oriented photocatalyst semiconductor surface that may allow to predict the polarity of the light, for a more efficient interaction with the oriented photoactive material 508 and increase the light harvesting efficiency. The EDM 502 of the nanocrystals is along the same axis, the rods are oriented in the same angle on the substrate, all in the same orientation.

According to another embodiment, alignment process 500 may be controlled using charged ligands. By controlling the charged ligands of the PCCN 102, specific orientations of the PCCN 102 may also be obtained.

In another embodiment, methods for the application of orientational forces 404 may include known in the art combing deposition technique, which may include a slowly wicking away solvent of the solution including the semiconductor nanocrystals 104 to be deposited, so that at the meniscus interface, semiconductor nanocrystals 104 experience a directional force along the direction of the wicking action.

In another embodiment, photoactive material 506 may pass through a surface charge. Some of the faces of PCCN 102 may be ionic in nature and by having a charged substrate it may be possible to predefine which face or faces of PCCN 102 interact or are attached to the substrate during deposition. Cationic faces may be attracted to negatively charged substrates and anionic faces may be attracted towards positively charged substrates. For example, in PCCN 102 including $Cd^{2+}$ or $Zn^{2+}$, are generally cationic in nature and a negatively-charged substrate may preferentially attract these crystal faces, resulting in some degree of orientation of PCCN 102.

In yet another embodiment, photoactive material 506 may be oriented employing a Langmuir Blodgett film, which may be formed by employing Langmuir Blodgett method, resulting in the alignment of a thin film monolayer of PCCN 102 along 2 axes (1D or 2D orientation) to form oriented photoactive material 508.

Employing the Langmuir Blodgett method a PCCN 102 monolayer may be formed on a water surface by compression and subsequently the PCCN 102 monolayer may be transferred onto a suitable substrate by a controlled removal of the water sub-phase.

In an embodiment, photoactive material 506 may be oriented by controlling the surface-ligands. By controlling the ligands on the surface of the PCCN 102 and ligands on the surface of the substrate, specific orientations of the PCCN 102 to the substrate may be obtained.

PCCN 102 may include one or more alignment ligands associated with the PCCN 102. The structurally ordering of the plurality of PCCN 102 may be achieved by the interaction of a first alignment ligand on a first PCCN 102 with a second alignment ligand on an adjacent PCCN 102. Generally the first and second alignment ligands may be complementary binding pairs. Optionally, both complements of the binding pair are provided on the same molecule (e.g., a multifunctional molecule). In some embodiments, a single chemical entity can be used as the first and second alignment ligands. Alternatively, the two halves of the complementary binding pair can be provided on different compositions, such that the first and second alignment ligands are differing molecules.

Interacting the first and second alignment ligands to achieve the selective orientation of the plurality of PCCN 102, can be performed, for example, by heating and cooling the plurality of PCCN 102. In embodiments in which the first and second alignment ligands further include a crosslinking or polymerizable element, interacting the alignment ligands may include the step of crosslinking or polymerizing the first and second alignment ligands, e.g., to form a matrix.

As a further embodiment of the methods of the present disclosure, the plurality of oriented PCCN 102 may be affixed to a substrate or surface. Optionally, the first and second alignment ligands may be removed after affixing the aligned PCCN 102, to produce a plurality of oriented PCCN 102 on a substrate.

After alignment process 500, oriented photoactive material 508 may be cut into films to be used as oriented photocatalyst semiconductor surfaces in energy conversion applications, including photocatalytic water splitting and carbon dioxide reduction.

Figure 6:
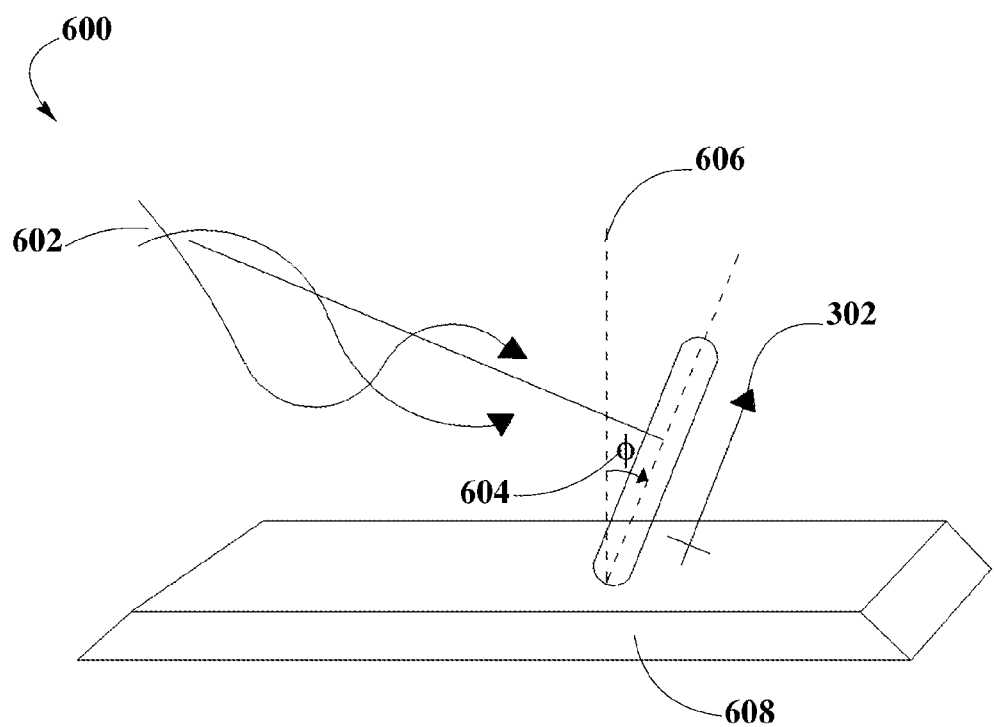
FIG. 6 depicts an embodiment oriented PCCN in nanorod configuration showing oriented dipole moment receiving light.

FIG. 6 depicts an embodiment of oriented PCCN 600 in nanorod configuration 200 showing oriented TDM 302 receiving light 602. TDM 302 of oriented PCCN 600 may be oriented at a fi angle 604 from an axis 606 normal to the upper surface of substrate 608 onto which PCCN 102 has been deposited. Additionally, in order for light 602 to be absorbed by PCCN 102, light 602 may have a non-zero component of its electric field vector in line with TDM 302 of PCCN 102.

Oriented Photoactive Material

Figure 7:
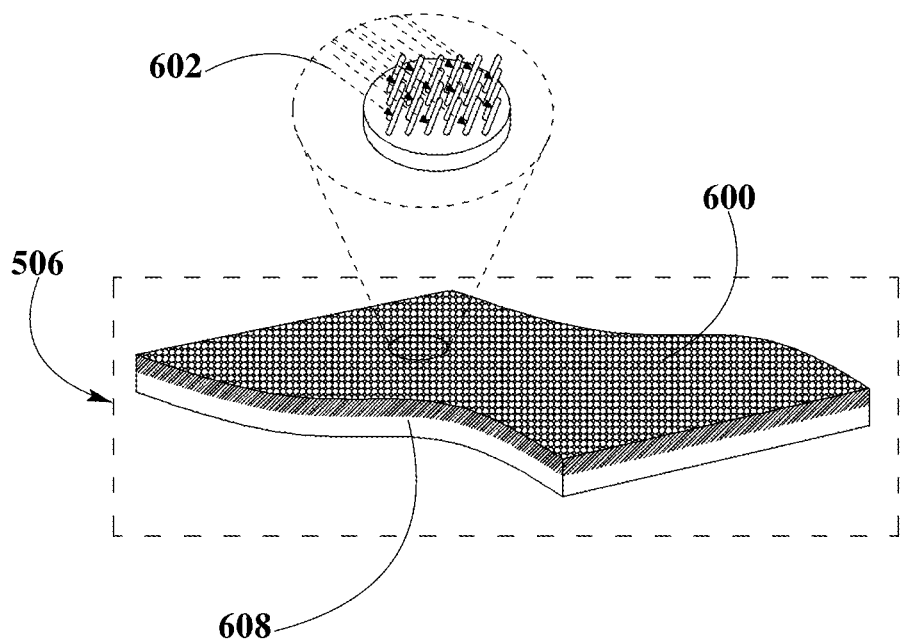
FIG. 7 illustrates an embodiment of oriented PCCN in nanorod configuration upon substrate.

FIG. 7 illustrates an embodiment of oriented photoactive material 508, including oriented PCCN 600 in nanorod configuration 200 upon substrate 608. Oriented PCCN 600 in oriented photoactive material 508 may also exhibit carbon nanotube, nanosprings and nanowire configuration, among others.

In order to measure the performance of oriented photoactive material 508, devices such as transmission electron microscopy (TEM), and energy dispersive X-ray (EDX), among others, may be utilized. Performance of oriented photoactive material 508 may be related to light absorbance, charge carriers mobility and energy conversion efficiency. Performance of oriented photoactive material 508 may be related to light absorbance, charge carriers mobility and energy conversion efficiency.

Oriented photoactive material 508 may be employed in any of a number of devices and applications, including, but not limited to, various photovoltaic devices, optoelectronic devices (LEDs, lasers, optical amplifiers), light collectors, photodetectors and/or the like. Oriented photoactive material 508 may be also employed in energy conversion processes, such as, water splitting and carbon dioxide reduction, among others.

System Configuration and Functioning

According to an embodiment, oriented photoactive material 508 may be employed in a water splitting process, during which a charge separation process 800 may occur.

Figure 8:
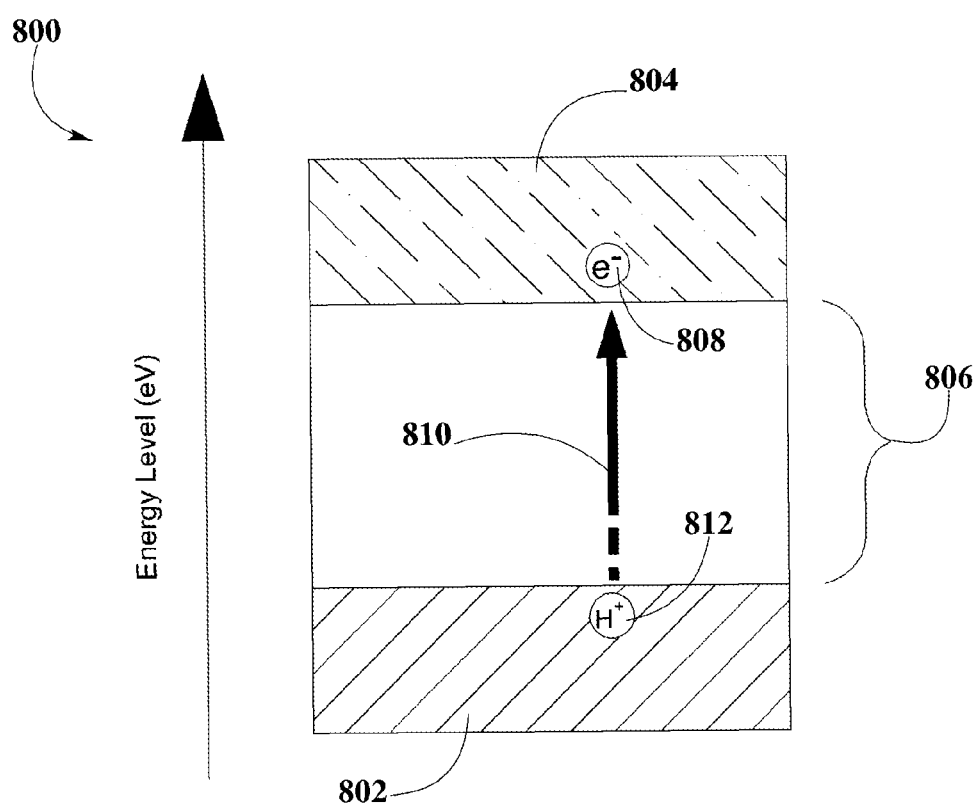
FIG. 8 depicts the charge separation process that may occur during water splitting process, according to an embodiment.

FIG. 8 shows charge separation process 800. In charge separation process 800, semiconductor nanocrystals 104 within oriented photoactive material 508 may be used to produce charge carriers for use in redox reactions for the water splitting process. The energy difference between valence band 802 and conduction band 804 of a semiconductor nanocrystal 104 is known as the band gap 806. The valence band 802 refers to the outermost electron 808 shell of atoms in semiconductor nanocrystals 104 in which electrons 808 are too tightly bound to the atom to carry electric current, while conduction band 804 refers to the band of orbitals that are high in energy and are generally empty. Band gap 806 of semiconductor nanocrystals 104 should be large enough to drive water splitting process reactions but small enough to absorb a large fraction of light 602 wavelengths. Accordingly, only photons with energy larger than or equal to band gap 806 are absorbed.

A process triggered by photo-excitation 810 may be triggered when light 602 with energy equal to or greater than that of band gap 806 makes contact with semiconductor nanocrystals 104 in photoactive material 506, and therefore electrons 808 are excited from valence band 802 to conduction band 804, leaving holes 812 behind in valence band 802. Changing the materials and shapes of semiconductor nanocrystals 104 may enable the tuning of band gap 806 and band-offsets to expand the range of wavelengths usable by semiconductor nanocrystal 104 and to tune the band positions for redox processes.

For water splitting process, the photo-excited electron 808 in semiconductor nanocrystal 104 should have a reduction potential greater than or equal to that necessary to drive the following reaction:

$$2H_3O^+ + 2e^- \rightarrow H_2 + 2H_2O \tag{1}$$

The above stated reaction has a standard reduction potential of 0.0 eV vs. the standard hydrogen electrode (SHE), or standard hydrogen potential of 0.0 eV. A hydrogen ($H_2$) molecule in water may be reduced when receiving two photo-excited electrons 808 moving from valence band 802 to conduction band 804. On the other hand, the photo-excited hole 812 should have an oxidation potential greater than or equal to that necessary to drive the following reaction:

$$6H_2O + 4h^+ \rightarrow O_2 + 4H_3O^+ \tag{2}$$

The above stated reaction may exhibit a standard oxidation potential of −1.23 eV vs. SHE. Oxygen ($O_2$) molecule in water may be oxidized by four holes 812. Therefore, the absolute minimum band gap 806 for semiconductor nanocrystal 104 in water splitting process reaction is 1.23 eV. Given over potentials and loss of energy for transferring the charges to donor and acceptor states, the minimum energy may be closer to 2.1 eV. The wavelength of the irradiation light 602 may be required to be about 1010 nm or less, in order to allow electrons 808 to be excited and jump over band gap 806.

Electrons 808 may acquire energy corresponding to the wavelength of the absorbed light 602. Upon being excited, electrons 808 may relax to the bottom of conduction band 804, which may lead to recombination with holes 812 and therefore to an inefficient water splitting process. For efficient charge separation process 800, a reaction has to take place to quickly sequester and hold electron 808 and hole 812 for use in subsequent redox reactions used for water splitting process.

Following photo-excitation 810 to conduction band 804, electron 808 can quickly move to the acceptor state of first inorganic capping agent 206 and hole 812 can move to the donor state of second inorganic capping agent 208, preventing recombination of electrons 808 and holes 812. First inorganic capping agent 206 acceptor state and second inorganic capping agent 208 donor state lie energetically between the band edge states and the redox potentials of the hydrogen and oxygen producing half-reactions. The sequestration of the charges into these states may also physically separate electrons 808 and holes 812, in addition to the physical charge carrier separation that occurs in the boundaries between individual semiconductor nanocrystals 104. Being more stable to recombination in the donor and acceptor states, charge carriers may be efficiently stored for use in redox reactions required for photocatalytic water splitting process.

According to an embodiment, for water splitting process a reaction vessel 1204 may be used. The reaction vessel 1204 may include oriented photoactive material 508 submerged in water. As a result of employing oriented photoactive material 508 for a water splitting process, improved efficiency of converting light 602 energy into chemical energy may be achieved. Hydrogen gas, when reacted with oxygen gas liberates 2.96 eV per water molecule. Thus, the required amount of chemical energy can be determined by multiplying the number of hydrogen molecules generated by 2.96 eV. The energy of solar light 602 is defined as the amount of energy in light 602 having a wavelength from about 300 nm to about 800 nm. A typical solar intensity as measured at the Earth's surface, thus defined, is about 500 watts/m$^2$. The efficiency of water splitting process can be calculated as:

$$\text{Efficiency} = [2.96 \text{ eV} \times (1.602 \times 10^{-19} \text{ J/eV}) \cdot N/t]/(I_L \times A_L)$$

where t is the time in seconds, $I_L$ is the light 602 intensity of (between 300 nm and 800 nm) in watts/m$^2$, $A_L$ is the area of light 602 entering a reaction vessel in m$^2$, N is the number of hydrogen molecules generated in time t, and 1 watt=1 J/s.

The reaction vessel may include oriented photoactive material 508 submerged in water. Light 602 coming from a light source may be polarized and directed, by a light polarizing system, at the reaction vessel through a window that may be placed on top of the vessel. Subsequently, the polarized light 602 may make contact with oriented photoactive material 508 to produce a charge separation and charge transfer (explained in FIG. 8) in the boundary between photoactive material 506 and water, splitting water into hydrogen and oxygen.

Any suitable light source may be employed to provide light 602 for generating water splitting process to produce hydrogen and oxygen. A preferable light source is sunlight, including infrared light 602 which may be used to heat water and also ultraviolet and visible light which may be used in water splitting process. The ultraviolet light and visible light may also heat water, directly or indirectly. Light 602 may be diffuse, direct, or both, filtered or unfiltered, modulated or unmodulated, attenuated or unattenuated. Preferably, light 602 may be polarized to increase the intensity and achieve a specific orientation towards oriented photoactive material 508. The polarizing system may include any suitable combination of mirrors, or any other suitable reflective surface, to increase the intensity of light 602. The increase in the intensity of light 602 may be characterized by the intensity of light 602 having from about 300 to about 1500 nm (e.g., from about 300 nm to about 800 nm) in wavelength. The polarizing system may increase the intensity of light 602 by any factor, preferably by a factor greater than about 2 to about 25.

Employing the polarization system, a partial linear polarization of light 602 may be achieved after reflecting off a single mirror face, so at least one mirrored surface may be necessary to achieve polarization. This may be the preferred method for achieving linearly-polarized light. However, in some embodiments, more than one mirrored face may be helpful to best guide the incident light to focus on the oriented photoactive material 508. To achieve linearly-polarized light, the first polarizing mirror may be kept at Brewster's angle relative to the direction of the sun. In some embodiments, the mirror may have a thin glass layer on top, which may serve as a protective layer to the reflective metal surface. For most applications, the protective glass layer may be thin enough to avoid undesired optical interference. Furthermore, in some embodiments, the system may optionally include a sun-tracking system that allows the mirror collecting incident light to be always at Brewster's angle relative to the sun. The addition of the sun tracking system may allow the optimal recollection of light at all times.

Figure 9:
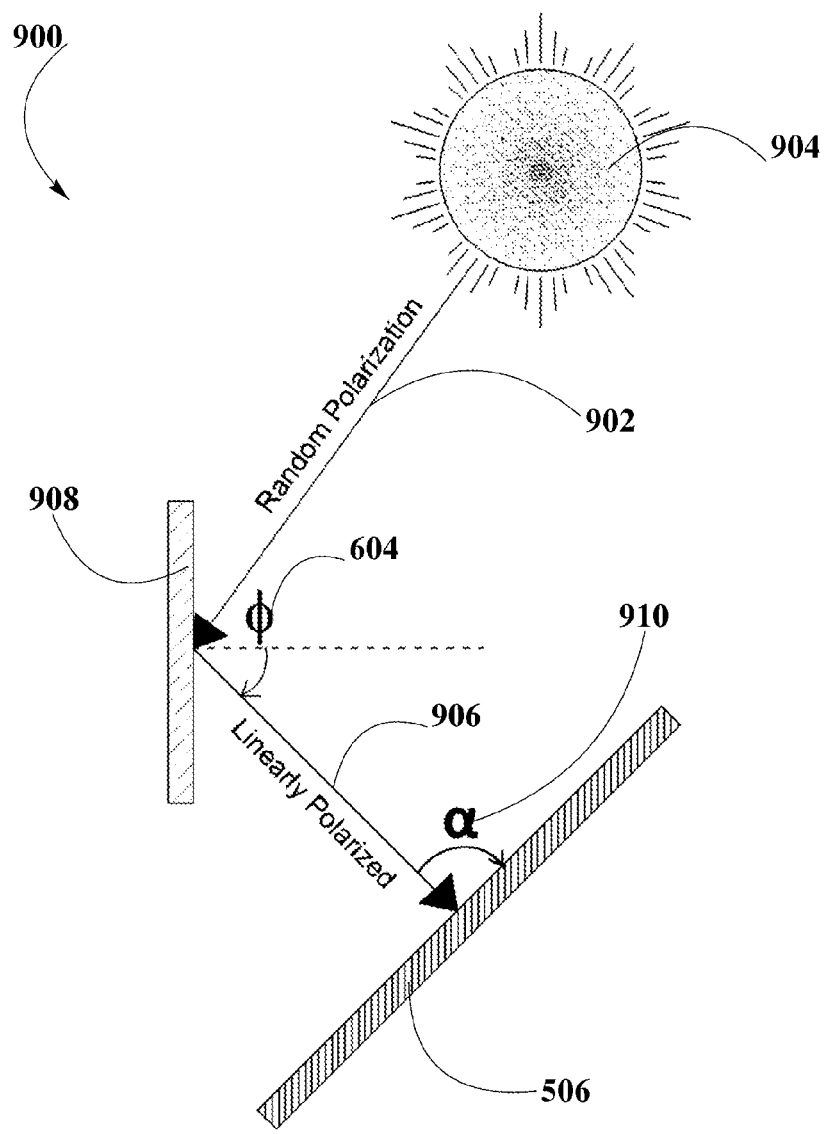
FIG. 9 shows a light polarization method, according to an embodiment.

FIG. 9 shows light polarization method 900. In light polarization method 900, randomly polarized incident light 902 irradiated by light source 904, which may be the sun, may become linearly polarized light 906, if randomly polarized incident light 902 hits the surface of mirror 908 at a fi angle 604, which is equivalent to the Brewster's angle of incidence of mirror 908. Oriented photoactive material 508 may be positioned in such a way that the alpha angle 910, at which linearly polarized light 906 reaches oriented photoactive material 508, allows the optimal absorption of linearly polarized light 906. A sun tracking system may be used to keep fi angle 604 and alpha angle 910 in a suitable range, such that efficiency may be increased at all times.

Figure 10:
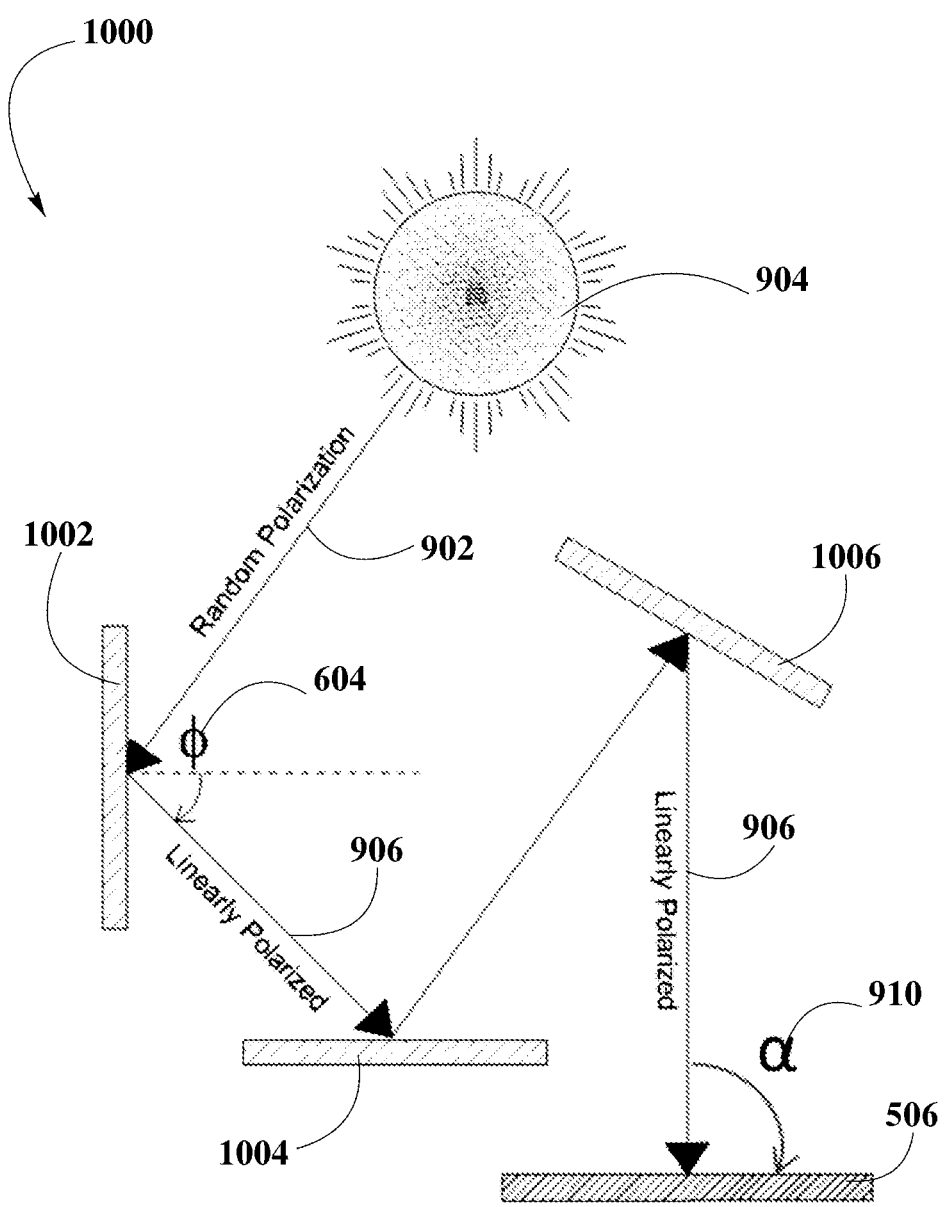
FIG. 10 shows a multiple mirror configuration, according to an embodiment.

FIG. 10 shows multiple mirror configuration 1000, which may be an embodiment of light polarization method 900. In multiple mirror configuration 1000, randomly polarized incident light 902 may be collected by tracking mirror 1002, which tracks the movement of light source 904 to collect and polarize sunlight, maintaining fi angle 604 equal to Brewster's angle of incidence. Then, first steering mirror 1004 and second steering mirror 1006 may direct linearly polarized light 906 towards oriented photoactive material 508 at the optimum alpha angle 910 of incidence. First steering mirror 1004 and second steering mirror 1006 may be capable of changing their relative position in order to ensure that at all times alpha angle 910 is maintained at optimal or preferred values. By the addition of first steering mirror 1004 and second steering mirror 1006, oriented photoactive material 508 may remain in a fixed position.

Figure 11:
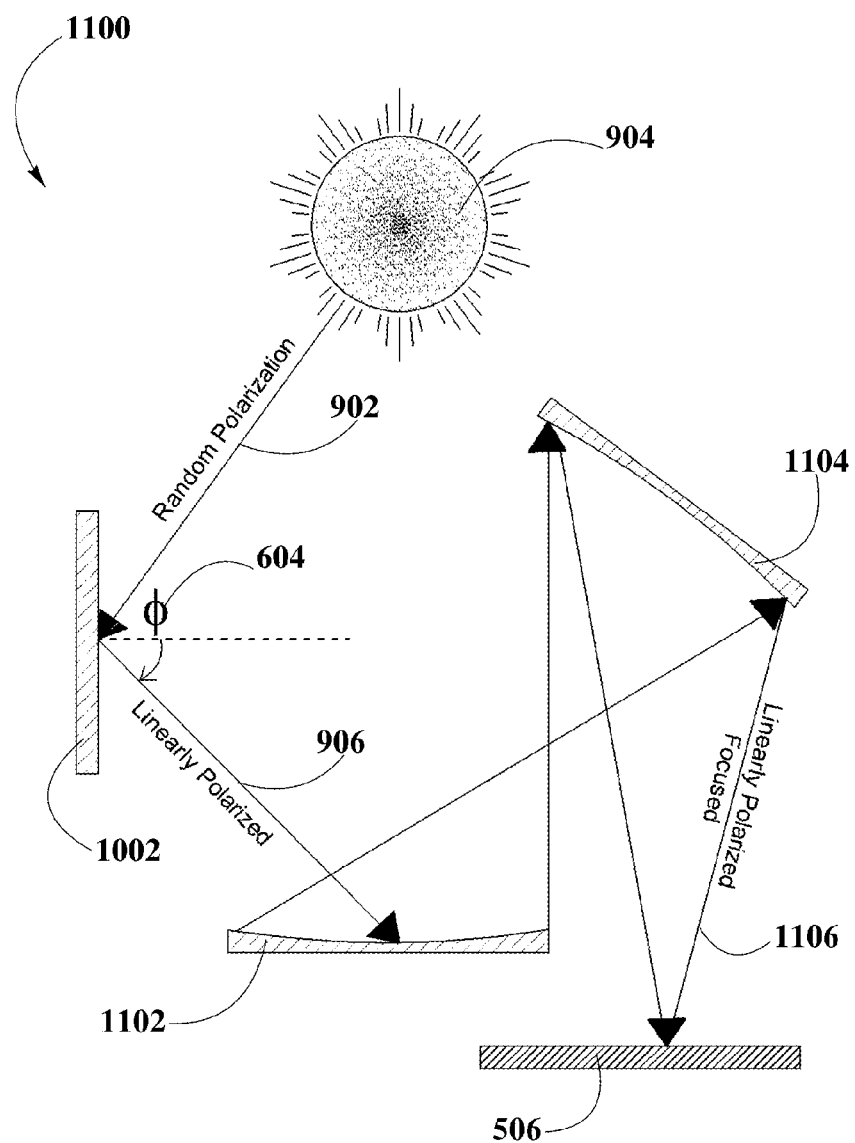
FIG. 11 shows focusing mirrors configuration, according to an embodiment.

FIG. 11 shows focusing mirrors configuration 1100, which may be an embodiment of light polarization method 900. In an embodiment, randomly polarized incident light 902 may be collected by tracking mirror 1002, which tracks the movement of light source 904 to collect and polarize sunlight, maintaining fi angle 604 equal to Brewster's angle of incidence. Then first focusing steering mirror 1102 and second focusing steering mirror 1104 may direct focused linearly polarized light 1106 towards oriented photoactive material 508. By focusing linearly polarized light 906 it may be possible to increase the efficiency and lower the necessary active surface of oriented photoactive material 508.

The systems explained above may be employed to polarize sunlight to collect solar energy and orient the light rays for an increased absorption and energy conversion on oriented photocatalytic surfaces.

Figure 12:
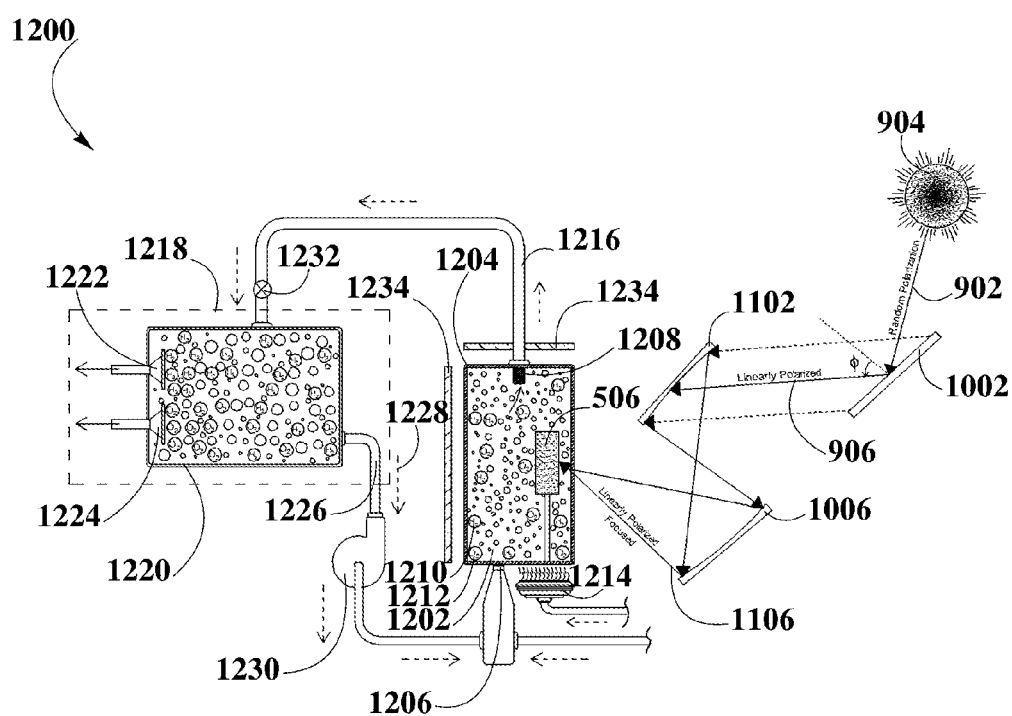
FIG. 12 illustrates a water splitting system employing the oriented PCCN, according to an embodiment.

FIG. 12 shows water splitting system 1200 employing oriented photoactive material 508. In water splitting system 1200, a continuous flow of water 1202 as gas or liquid may enter reaction vessel 1204 through a nozzle 1206. Subsequently, water 1202 may pass through a region including oriented photoactive material 508 and may exit through a filter 1208. Water 1202 coming through nozzle 1206 may also include hydrogen gas 1210, oxygen gas 1212 and other gases such as an inert gas or air. According to an embodiment, water 1202 entering reaction vessel 1204 may include recirculated gas removed from reaction vessel 1204 and residual water 1202 which did not react in reaction vessel 1204 along with hydrogen gas 1210 and oxygen gas 1212, as well as any other gas in water splitting system 1200. Preferably, a heater 1214 is connected to reaction vessel 1204 to produce heat, so that water 1202 may boil, facilitating the extraction of hydrogen gas 1210 and oxygen gas 1212 through filter 1208. Heater 1214 may be powered by different energy supplying devices. Preferably, heater 1214 may be powered by renewable energy supplying devices, such as photovoltaic cells, or by energy stored employing the system and method from the present disclosure. Materials for the walls of reaction vessel 1204 may be selected based on the reaction temperature.

Filter 1208 may collect impurities from water 1202, and may also allow the exhaust of water 1202 from reaction vessel 1204, including hydrogen gas 1210, oxygen gas 1212 and water 1202 which may flow through exhaust tube 1216.

After passing through reaction vessel 1204, water 1202, hydrogen gas 1210, and oxygen gas 1212 may be transferred through exhaust tube 1216 to a collector 1218 which may include a reservoir 1220 connected to a hydrogen permeable membrane 1222 (e.g. silica membrane) and an oxygen permeable membrane 1224 (e.g. silanized alumina membrane) for collecting hydrogen gas 1210 and oxygen gas 1212 to be stored in tanks or any other suitable storage equipment. Collector 1218 may also be connected to a recirculation tube 1226 which may transport remaining exhaust gas 1228 back to nozzle 1206 to supply additional water 1202 to reaction vessel 1204. Additionally, remaining exhaust gas 1228 may be used to heat water 1202 entering nozzle 1206. The flow of hydrogen gas 1210, oxygen gas 1212 and water 1202 in water splitting system 1200 may be controlled by one or more pumps 1230, valves 1232, or other flow regulators. Alternatively, a solar reflector 1234 may be positioned at the bottom or at any side of reaction vessel 1204 to reflect focused linearly polarized light 1106 back to reaction vessel 1204 and re-utilize the focused linearly polarized light 1106.

The water splitting process taking place in the boundary between oriented photoactive material 508 and water 1202, where oriented photoactive material 508 may include PCCN 102. In FIG. 12, PCCN 102 may include a first semiconductor nanocrystal 202 and a second semiconductor nanocrystal 204 capped respectively with first inorganic capping agent 206 and second inorganic capping agent 208. According to an embodiment, first inorganic capping agent 206 and second inorganic capping agent 208 act as a reduction photocatalyst and an oxidation photocatalyst, respectively. When focused linearly polarized light 1106 makes contact with first semiconductor nanocrystal 202 and second semiconductor nanocrystal 204, charge separation process 800 and charge transfer process may take place between first semiconductor nanocrystal 202, second semiconductor nanocrystal 204, first inorganic capping agent 206 and second inorganic capping agent 208. As a result, hydrogen is reduced by electrons 808 moving from valence band 802 to conduction band 804 on first semiconductor nanocrystal 202 when electrons 808 are transferred via first inorganic capping agent 206 to water 1202, producing hydrogen gas 1210 molecules. On the other hand, oxygen is oxidized by holes 812 on second semiconductor nanocrystal 204 when holes 812 are transferred via second inorganic capping agent 208 to water 1202, resulting in the production of oxygen gas 1212 molecules.

According to various embodiments, one or more walls of reaction vessel 1204 may be formed of glass or other transparent material, so that focused linearly polarized light 1106 may enter to reaction vessel 1204 from many directions. In another embodiment, reaction vessel 1204 may have one side which is transparent to allow the incident radiation to enter and the other sides may have a reflective interior surface which reflects the majority of the solar radiation.

While various aspects and embodiments have been disclosed, other aspects and embodiments are contemplated. The various aspects and embodiments disclosed are for purposes of illustration and are not intended to be limiting, with the true scope and spirit being indicated by the following claims.

EXAMPLES

Example #1 is an embodiment of the method 100, where the substitution of organic capping agents with inorganic capping agents, which may be illustrated when CdSe is capped with a layer of organic capping agent and is soluble in non-polar or organic solvents such as hexane. Inorganic capping agent, $Sn_2Se_6^{2-}$, is soluble in polar solvents such as DMSO. DMSO and hexane are appreciably immiscible, however. Therefore, a hexane solution of CdSe floats on a DMSO solution of $Sn_2Se_6^{2-}$. After combining the two solutions (for about 10 minutes), the color of the hexane solution fades Within a short time, due to the presence of CdSe. At the same time, the DMSO layer becomes colored as the organic capping agents are displaced by the inorganic capping agents. The resulting surface-charged semiconductor nanocrystals 104 are then soluble in a polar DMSO solution. The uncharged organic capping agent is preferably soluble in the non-polar solvent and may be there physically separated, from the semiconductor nanocrystal 104, using a separation funnel. In this manner, organic capping agents from the organic capped semiconductor nanocrystals 104 are removed. CdSe and $Sn_2Se_6^{2-}$ may be obtained from Sigma-Aldrich.

Example #2 is an embodiment of water splitting system 1200, where an energy generation system may be used to generate and store hydrogen gas 1210 and oxygen gas 1212 for use in a hydrogen fuel cell, generating electricity that may be employed in one or more electrically driven applications, according to an embodiment.

Hydrogen gas 1210 and oxygen gas 1212 resulting from water splitting system 1200 may be stored in a hydrogen storage and oxygen storage. Hydrogen gas 1210 and oxygen gas 1212 may then be combined in a hydrogen fuel cell that may produce water vapor or liquid and electricity, the latter of which may be provided to an electric grid, used in an electrically driven application (e.g. a motor, light, heater, pump, amongst others), stored in a battery, or any suitable combination thereof.

According to another embodiment, electricity may be produced by burning hydrogen gas 1210 to produce steam and then generating electricity using a steam Rankine cycle—generator set.

The energy generation system may be mounted on a structure such as the roof of a building, or may be free standing, such as in a field. Energy generation system may be stationary, or may be on a mobile structure (e.g. a transportation vehicle, such as a boat, an automotive vehicle, and farming machinery). The mounting of energy generation system may include elements for adjusting the positioning of reaction vessel 1204, light polarizing system or both, such that the intensity of focused linearly polarized light 1106 in reaction vessel 1204 may be increased. For example, light polarizing system may be adjusted to track the position sunlight. Such adjustments to the position may be made to accommodate seasonal or daily positioning of the sun. Preferably the adjustments are made frequently throughout the day.

Example #3 is an embodiment of water splitting system 1200, where a hydrogen fuel cell may be used for mixing hydrogen gas 1210 and oxygen gas 1212 for the production of electricity and water 1202. Hydrogen fuel cell may include two electrodes, an anode making contact with hydrogen gas 1210 and a cathode making contact with oxygen gas 1212, separated by an electrolyte that allows charges to move between both sides of hydrogen fuel cell. Electrolyte is electrically insulating, specifically designed so holes 812 ($H^+$) can pass through, but electrons 808 ($e-$) cannot.

At the anode, a catalyst oxidizes incoming hydrogen gas 1210, forming hydrogen holes 812 and electrons 808. Hydrogen gas 1210 that has not reacted with the catalyst in the anode may leave hydrogen fuel cell via hydrogen exhaust. Freed electrons 808 may travel through a conductor such as a wire creating electricity that may be used to power electrically driven applications, while holes 812 may travel through electrolyte to the cathode. Once reaching the cathode, holes 812 may reunite with electrons 808, subsequently reacting and combining with oxygen gas 1212, to produce water 1202.

It should be understood that the present disclosure is not limited in its application to the details of construction and arrangements of the components set forth here. The present disclosure is capable of other embodiments and of being practiced or carried out in various ways. Variations and modifications of the foregoing are within the scope of the present disclosure. It also being understood that the invention disclosed and defined here extends to all alternative combinations of two or more of the individual features mentioned or evident from the text and/or drawings. All of these different combinations constitute various alternative aspects of the present invention. The embodiments described here explain the best modes known for practicing the invention and will enable others skilled in the art to utilize the invention.

Thus the scope of the invention should be determined by the appended claims and their legal equivalents, and not by the examples given.

The embodiments described above are intended to be exemplary. One skilled in the art recognizes that numerous alternative components and embodiments that may be substituted for the particular examples described herein and still fall within the scope of the invention.

What is claimed is:

1. A method of water splitting comprising:
   forming photocatalytic capped colloidal nanocrystals, wherein each photocatalytic capped colloidal nanocrystal includes a first semiconductor nanocrystal capped with a first inorganic capping agent;
   depositing the formed photocatalytic capped colloidal nanocrystals onto a substrate;
   orienting the photocatalytic capped colloidal nanocrystals, wherein the oriented photocatalytic capped colloidal nanocrystals are included in a reaction vessel;
   linearly polarizing irradiated sunlight with at least one reflective surface kept at a Brewster's angle relative to the irradiated sunlight;
   absorbing the irradiated sunlight with an energy equal to or greater than the band gap of the semiconductor nanocrystals by the photocatalytic capped colloidal nanocrystals to create charge carriers in a conduction band of the photocatalytic capped colloidal nanocrystals and holes in a valence band of the photocatalytic capped colloidal nanocrystals;
   passing water through the reaction vessel so that the water reacts with the photocatalytic capped colloidal nanocrystals and forms hydrogen gas and oxygen gas, wherein the charge carriers in the conduction band reduce hydrogen molecules from the water and the holes oxidize oxygen molecules from the water; and
   collecting the hydrogen gas and the oxygen gas in a reservoir that includes a hydrogen permeable membrane and an oxygen permeable membrane.

2. The method of claim 1, wherein the at least one reflective surface is at least one mirror, the method further comprising:
   polarizing the irradiated sunlight with the at least one mirror before the photocatalytic capped colloidal nanocrystals absorb the irradiated sunlight.

3. The method of claim 2, further comprising:
   steering the at least one mirror so that the at least one mirror maintains the Brewster's angle relative to the irradiated sunlight.

4. The method of claim 3, wherein the at least one mirror is steered using a sun tracking system.

5. The method of claim 3, further comprising focusing the polarized sunlight with a focusing mirror.

6. The method of claim 3, further comprising:
   steering a second mirror so that the polarized sunlight is directed at the oriented photocatalytic capped colloidal nanocrystals at an angle that facilitates optimal absorption.

7. The method of claim 1, wherein forming photocatalytic capped colloidal nanocrystals comprises:
   growing semiconductor nanocrystals by employing a template-driven seeded growth method; and
   capping the semiconductor nanocrystals with an inorganic capping agent in a polar solvent to form photocatalytic capped colloidal nanocrystals.

8. The method of claim 7, wherein growing semiconductor nanocrystals by employing the template-driven seeded growth method comprises:
   depositing a seed crystal on a substrate; and
   growing the semiconductor nanocrystal from the seed crystal using molecular beam epitaxy or chemical beam epitaxy so that the semiconductor nanocrystal grows according to the seed crystal's structure.

9. The method of claim 7, wherein capping the semiconductor nanocrystals with an inorganic capping agent in the polar solvent to form the photocatalytic capped colloidal nanocrystals comprises:
   reacting semiconductor nanocrystals precursors in the presence of an organic capping agent to form organic capped semiconductor nanocrystals;
   reacting the organic capped semiconductor nanocrystals with an inorganic capping agent;
   adding immiscible solvents causing the dissolution of the organic capping agents and the inorganic capping agents so that organic caps on the semiconductor nanocrystals are replaced by inorganic caps to form inorganic capped semiconductor nanocrystals; and
   performing an isolation procedure to purify the inorganic capped semiconductor nanocrystals and remove the organic capping agent.

10. The method of claim 1, wherein orienting the photocatalytic capped colloidal nanocrystals is performed by applying an electric field, and the direction of the electric field is substantially parallel with a desired electric dipole moment of the photocatalytic capped colloidal nanocrystals.

11. The method of claim 4, wherein the photocatalytic capped colloidal nanocrystals include charged ligands that assist in controlling the orientation of the photocatalytic capped colloidal nanocrystals.

12. The method of claim 1, wherein orienting the photocatalytic capped colloidal nanocrystals is performed by a combing deposition technique.

13. The method of claim 1, wherein orienting the photocatalytic capped colloidal nanocrystals is performed by employing a Langmuir Blodgett method to form a Langmuir Blodgett film.

14. The method of claim 1, wherein the photocatalytic capped colloidal nanocrystals comprises one compound selected from a group consisting of ZnS.TiO2, TiO2.CuO, ZnS.RuOx, ZnS.ReOx, Au.AsS3, Au.Sn2S6, Au.SnS4, Au.Sn2Se6, Au.In2Se4, Bi2S3.Sb2Te5, Bi2S3.Sb2Te7, Bi2Se3.Sb2Te5, Bi2Se3.Sb2Te7, CdSe.Sn2S6, CdSe.Sn2Te6, CdSe.In2Se4, CdSe.Ge2S6, CdSe.Ge2Se3, CdSe.HgSe2, CdSe.ZnTe, CdSe.Sb2S3, CdSe.SbSe4, CdSe.Sb2Te7, CdSe.In2Te3, CdTe.Sn2S6, CdTe.Sn2Te6, CdTe.In2Se4, Au/PbS.Sn2S6, Au/PbSe.Sn2S6, Au/PbTe.Sn2S6, Au/CdS.Sn2S6, Au/CdSe.Sn2S6, Au/CdTe.Sn2S6, FePt/PbS.Sn2S6, FePt/PbSe.Sn2S6, FePt/PbTe.Sn2S6, FePt/CdS.Sn2S6, FePt/CdSe.Sn2S6, FePt/CdTe.Sn2S6, Au/PbS.SnS4, Au/PbSe.SnS4, Au/PbTe.SnS4, Au/CdS.SnS4, Au/CdSe.SnS4, Au/CdTe.SnS4, FePt/PbS.SnS4 FePt/PbSe.SnS4, FePt/PbTe.SnS4, FePt/CdS.SnS4, FePt/CdSe.SnS4, FePt/CdTe.SnS4, Au/PbS.In2Se4 Au/PbSe.In2Se4, Au/PbTe.In2Se4, Au/CdS.In2Se4, Au/CdSe.In2Se4, Au/CdTe.In2Se4, FePt/PbS.In2Se4 FePt/PbSe.In2Se4, FePt/PbTe.In2Se4, FePt/CdS.In2Se4, FePt/CdSe.In2Se4, FePt/CdTe.In2Se4, CdSe/CdS.Sn2S6, CdSe/CdS.SnS4, CdSe/ZnS.SnS4,CdSe/CdS.Ge2S6, CdSe/CdS.In2Se4, CdSe/ZnS.In2Se4, Cu.In2Se4, Cu2Se.Sn2S6, Pd.AsS3, PbS.SnS4, PbS.Sn2S6, PbS.Sn2Se6, PbS.In2Se4, PbS.Sn2Te6, PbS.AsS3, ZnSe.Sn2S6, ZnSe.SnS4, ZnS.Sn2S6, and ZnS.SnS4.

15. The method of claim 1, wherein a shape of the photocatalytic capped colloidal nanocrystals is chosen based on a desired wavelength of the irradiated sunlight usable by the semiconductor nanocrystals.

16. The method of claim 1, further comprising:
recycling the unreacted water by passing unreacted water in the reservoir back into the reaction vessel.

17. The method of claim 1, further comprising:
heating the water entering the reaction vessel so that the water boils and is in a gaseous state when reacting with the photocatalytic capped colloidal nanocrystals in the reaction vessel.

18. The method of claim 1, further comprising:
filtering the unreacted water, the hydrogen gas, and the oxygen gas leaving the reaction vessel.

19. The method of claim 1, wherein each photocatalytic capped colloidal nanocrystals includes a second semiconductor nanocrystal capped with a second inorganic capping agent, the first inorganic capping agent acts as a reduction photocatalyst, and the second inorganic capping agent acts as an oxidation photocatalyst.

* * * * *